United States Patent
Wurschung et al.

(10) Patent No.: US 8,981,648 B2
(45) Date of Patent: Mar. 17, 2015

(54) FAST WARM-UP AND INSTANT LIGHT ENERGY SAVING LAMP ASSEMBLY

(75) Inventors: Istvan Wurschung, Budapest (HU); Jozsef Fulop, Budapest (HU); Fetenc Papp, Budapest (HU); Sandor Lukacs, Budapest (HU); Peter Vigh, Budapest (HU)

(73) Assignee: General Electric Company, Schenectady, NY (US)

( * ) Notice: Subject to any disclaimer, the term of this patent is extended or adjusted under 35 U.S.C. 154(b) by 289 days.

(21) Appl. No.: 12/748,683

(22) Filed: Mar. 29, 2010

(65) Prior Publication Data

US 2011/0234094 A1    Sep. 29, 2011

(51) Int. Cl.
*H05B 35/00*    (2006.01)

(52) U.S. Cl.
CPC *H05B 35/00* (2013.01); *Y02B 20/19* (2013.01)
USPC .............................. 315/112; 315/116; 315/118

(58) Field of Classification Search
CPC ........... H05B 35/00; Y02B 20/19; H01K 1/62
USPC .............................. 315/47, 94, 291, 112–118
See application file for complete search history.

(56) References Cited

U.S. PATENT DOCUMENTS

| | | | |
|---|---|---|---|
| 4,382,210 A | | 5/1983 | Buhrer |
| 5,309,061 A | * | 5/1994 | Bouchard et al. ............... 315/47 |
| 5,491,385 A | * | 2/1996 | Nilssen ......................... 315/178 |
| 5,595,438 A | * | 1/1997 | Burd ............................. 362/228 |
| 5,909,085 A | * | 6/1999 | Nelson ............................ 315/94 |
| 2011/0187256 A1 | * | 8/2011 | Tyagi et al. ....................... 313/1 |

FOREIGN PATENT DOCUMENTS

| | | |
|---|---|---|
| DE | 29602039 U1 | 4/1996 |
| EP | 0961075 A2 | 12/1999 |
| EP | 1 883 099 | 1/2008 |
| JP | 04204415 A * | 7/1992 |
| JP | 2000-164174 | 6/2000 |
| JP | 2000164174 A * | 6/2000 |
| WO | 2005/018285 A1 | 2/2005 |

OTHER PUBLICATIONS

PCT Search Report issued in connection with corresponding WO Patent Application No. US11/28247 filed on Mar. 12, 2011.

* cited by examiner

*Primary Examiner* — Tuyet Thi Vo
*Assistant Examiner* — Henry Luong
(74) *Attorney, Agent, or Firm* — Fay Sharpe LLP

(57) ABSTRACT

A lamp assembly provides both instant light through use of an incandescent/halogen lamp source and an energy saving type light provided by a compact fluorescent lamp source. Both light sources are enclosed within a common envelope or outer bulb. The sensor member monitors a temperature of the cathode and mercury reservoir of the compact fluorescent lamp source in order to determine when to terminate power to the incandescent lamp source.

20 Claims, 3 Drawing Sheets

FAST WARM-UP AND INSTANT LIGHT ENERGY SAVING LAMP ASSEMBLY

BACKGROUND OF THE DISCLOSURE

This disclosure is directed to a lamp assembly, and particularly a lamp assembly that provides energy savings. More specifically, the lamp assembly also provides for instant light and fast warm-up.

A number of different solutions currently exist to improve run-up behavior, i.e., reducing the time to full light associated with starting or igniting fluorescent lamps. By way of example only, long-life compact fluorescent lamps need approximately 0.5 to 1.5 seconds to preheat the cathodes or electrodes before starting. Before preheating is complete, there is no light emission from the lamp. Once the arc discharge is initiated, the compact fluorescent lamp (CFL) still requires an additional approximately 20 to 120 seconds or more to reach full light output.

Prior arrangements have attempted to reduce the run-up time of a CFL that uses amalgam mercury dosing by incorporating an auxiliary amalgam close to one of the electrodes in the lamp. As a result of this arrangement, mercury stored in the auxiliary amalgam is vaporized shortly after switching on. In this way, the run-up period is reduced, although this proposed solution does not provide an instant light feature.

Another proposed solution combines two lamps in one unit. More particularly, a compact fluorescent lamp and a conventional incandescent lamp are combined. Although it has been suggested to simultaneously turn on both lamps in order to result in instant light from the incandescent lamp, and then subsequently terminate or switch off the incandescent lamp, these known arrangements do not provide an efficient and effective manner for warming up the mercury source. For example, it has been suggested that a thermally sensitive element be located in the ballast compartment. This arrangement does not provide an accurate assessment of the actual thermal conditions of the discharge vessel. Further, locating a thermally sensitive element in a ballast compartment is potentially impacted by temperature variations caused by different illumination positions of the lamp e.g. vertically upright or inverted. As a result, the thermally sensitive element does not provide an accurate representation of the heat conditions.

Still another proposed solution is to apply power to the incandescent lamp only when the lamp assembly is turned on or switched on. Once a predetermined temperature is reached, the switch then de-energizes the incandescent lamp and subsequently applies power to the fluorescent lamp. Although the thermal switch associated with this arrangement aids in starting of the fluorescent lamp in low temperature, ambient conditions, it does not improve run-up of the lamp assembly.

In still another arrangement, a compact fluorescent lamp is used in conjunction with a small incandescent lamp and AC power line voltage is provided. An inverter-type ballast is combined with the lamp base and is operable to power the fluorescent lamp whenever the base is received in the associated lamp socket. A thyristor or silicon controller rectifier (SCR) causes total light provided from the combination fluorescent-incandescent lamp assembly to remain substantially constant from the moment that AC power line voltage is provided at the lamp socket. When the AC power line voltage is initially provided, light from the incandescent lamp is at its maximum, while light provided from the fluorescent lamp will be at a minimum. Thereafter, light from the incandescent lamp will gradually diminish as the fluorescent lamp gradually increases. After a period, the AC power line voltage is totally disconnected from the incandescent lamp. Unfortunately, due to the SCR, the RMS value of the input power is about 70% of the nominal and results in a specialized incandescent lamp.

Consequently, a need exists for a long-life compact fluorescent lamp that provides energy savings with instant light capabilities and fast warm-up, and overcomes the problems noted with prior proposed solutions.

SUMMARY OF THE DISCLOSURE

A lamp assembly of the present disclosure provides for fast warm-up, instant light, and is also an energy saving lamp that advantageously uses two light sources in a single outer bulb.

The preferred lamp assembly includes a lamp base having a compartment. A fluorescent lamp source and an incandescent lamp source are each mounted to the lamp base. An envelope forms a cavity around at least the fluorescent and incandescent lamp sources. A power control module received in the lamp base compartment is operatively connected to the lamp sources, and a shield extends between the lamp base compartment and the envelope cavity. A sensor member disposed in the envelope cavity monitors whether to terminate power supply to the incandescent lamp source.

The sensor is preferably a thermal sensor for monitoring the temperature in the envelope cavity, and more particularly the thermal sensor is located adjacent a cathode of the fluorescent lamp source.

A power control module terminates power to the incandescent lamp source once the fluorescent lamp source has reached approximately 80% of its steady state operation.

The incandescent lamp source is preferably disposed adjacent the fluorescent lamp source, and the thermal sensor member disposed adjacent a mercury reservoir in the fluorescent lamp source. More particularly, the thermal sensor member is disposed adjacent a cathode of the fluorescent lamp source in order to accurately monitor a temperature thereof. In one arrangement, the incandescent lamp source is a tungsten halogen lamp.

A method of assembling a lamp assembly includes providing a lamp base, mounting a fluorescent lamp source to the base, positioning an incandescent lamp source adjacent the fluorescent lamp source, enclosing at least the fluorescent lamp source and the incandescent lamp source in a common bulb, locating a thermal sensor in the bulb to monitor a temperature therein, and connecting the fluorescent lamp source and the incandescent lamp source to a power control module for selectively terminating power to the incandescent lamp source in response to a predetermined temperature of the fluorescent lamp source.

The method includes mounting the thermal sensor adjacent a cathode enclosed within a discharge tube wall of the fluorescent lamp source.

A primary benefit of the present disclosure is the ability to provide instant with an energy saving lamp assembly that has a fast warm-up.

Another benefit resides in that both light sources are located within a common outer bulb to achieve the shortest warm-up period by reducing wasted heat to the environment.

Still another benefit is associated with a simple construction that is easy to manufacture and is low cost.

Still other benefits and advantages of the present disclosure will become apparent upon reading and understanding the following detailed description.

DETAILED DESCRIPTION OF THE PREFERRED EMBODIMENTS

Figure 1:
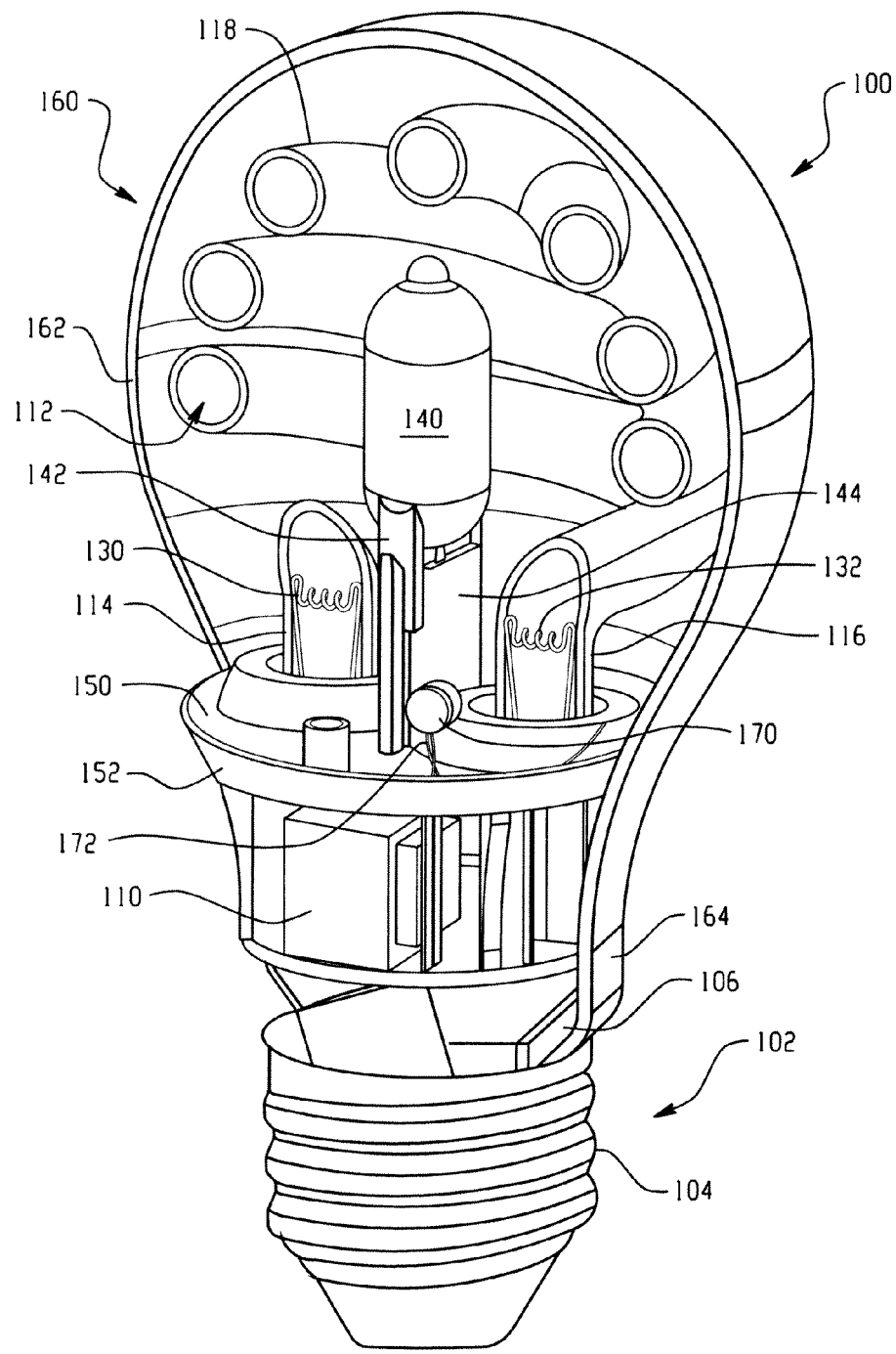
FIG. 1 is an elevational view of the lamp assembly, with portions of the bulb and fluorescent lamp source in cross-section.
Figure 2:
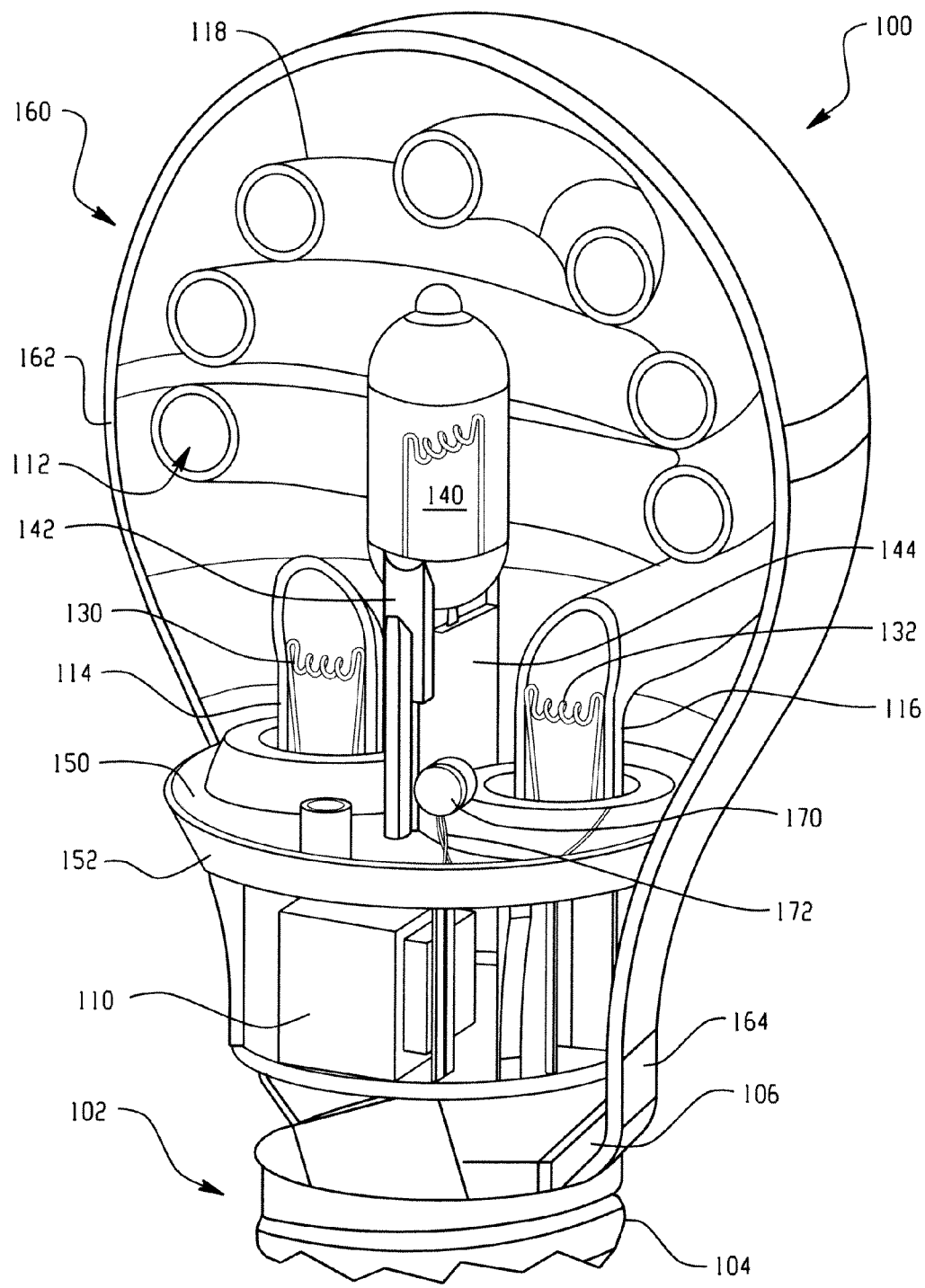
FIG. 2 is an enlarged view of the lamp assembly shown in partial cross-section.

FIGS. 1 and 2 show a lamp assembly, and more particularly a compact fluorescent lamp assembly 100 that is generally referred to as an energy saving lamp or light source that advantageously provides instant light and fast warm-up. A lamp base 102 includes a mechanical and electrical arrangement for receipt in an associated lamp socket (not shown) to mechanically support the lamp assembly 100 and provide power to operate the lamp assembly. More particularly, and without need to be limiting, a conventional Edison-base 102 is shown that includes a conductive, threaded metal shell 104 for threaded receipt in an associated lamp socket, and typically includes an electrical eyelet or second contact (not shown) spaced from the threaded shell 104 by insulating material at the lower end of the lamp assembly. This arrangement provides a two lead arrangement for establishing electrical contact associated with the lamp socket in a manner generally known in the art.

At least a portion of the lamp base forms a compartment or inner cavity 106 that receives a power control module 110 such as a ballast mounted on a printed circuit board that allows an AC source to drive the lamp sources or light emitting components of the lamp assembly 100. For example, a ballast is typically enclosed within a portion of compartment 106. Mounted to the lamp base is a first or fluorescent lamp source 112. The illustrated fluorescent lamp source is preferably a spiral configuration or double-helix arrangement that includes first and second legs 114, 116 that have lower portions that extend in substantially parallel relation to a longitudinal axis of the lamp assembly. The legs are disposed adjacent the power control module or ballast in order to provide ease of connection. Intermediate the first and second legs 114, 116, a remainder of discharge tube 118 adopts a generally spiral configuration of the compact fluorescent lamp source. A fill gas is sealed within the discharge tube, and electrodes or cathodes 130, 132 are provided in the respective legs 114, 116, and thus located at opposite ends of an elongated discharge path that extends through the length of the spiral discharge tube. As is known in the art, an arc is initiated between the cathodes and light emitted from the ionized fill is emitted as visible light in a desired color by passing through a phosphor provided on an inner surface of the discharge tube.

A second or incandescent lamp source 140, such as an incandescent or tungsten halogen lamp source having a filament (not shown), is also mounted to the lamp base. In another preferred arrangement, the second lamp source is a tungsten halogen lamp. As illustrated in FIGS. 1 and 2, the incandescent lamp source is a single ended source that is centrally located within a hollow interior region formed within the spiral portion of the CFL. Particularly, base region or leg 142 of the incandescent lamp source 140 is received in a support 144 that extends from a shield or barrier 150 that separates the compartment of the lamp base that houses the power control module from the light emitting portions of the first and second lamp sources 112, 140. The lamp sources are also preferably housed or enclosed within a common envelope or outer bulb 160. The bulb is dimensioned to enclose the CFL source 112 and the incandescent lamp source 140 within its hollowed, generally spherical portion 162 and the bulb has a reduced dimension as it proceeds for sealed engagement with the lamp base along a necked-down region 164. Preferably, the shield 150 is located within this transition region between the spherical portion 162 and the necked-down region 164 of the bulb and the shield advantageously protects the heat sensitive components of the power control module 110 from the elevated temperatures associated with operation of the first and second lamp sources 112, 140. A perimeter portion 152 of the shield abuts against the inner surface of the bulb, while selected openings through the barrier permit the electrical connections between the legs of the CFL source 112 and the incandescent lamp source 140 with the power control module.

A sensor member 170 is disposed in the envelope to monitor whether to terminate electrical power to the incandescent lamp source. More particularly, the sensor member 170 is a thermal sensor that monitors temperature in the envelope. More particularly, the thermal sensor is located adjacent a cathode 132 of the fluorescent lamp source, and is thus preferably positioned adjacent the discharge tube wall 118 near one of the cathodes 130, 132. An amalgam mercury dose that is included in the fill of the discharge tube is located close to one of the cathodes of the lamp. Since mercury is an important component of the initiation or ignition of the arc in the compact fluorescent lamp source, monitoring the temperature of the cathode region or mercury reservoir region provides an accurate assessment for operation of the CFL. The sensor communicates with the power control module 110 via leads 172 that are fed through an opening in the shield and connect to the printed circuit board of the power control module.

The incandescent lamp source 140 provides an instant light type of light source when power is switched on to the lamp assembly 100. Moreover, the incandescent lamp source heats up both the mercury reservoir and the entire discharge vessel of the energy saving type of light source or compact fluorescent lamp source 112. The heat from the incandescent light source results in a faster evaporation of the mercury from the mercury reservoir into the discharge vessel. Thus, upon switching on the lamp assembly, power is provided to both of the light sources. The incandescent lamp source 140 provides instant light and also provides desired heat to warm-up the fluorescent lamp source 112. Once the fluorescent lamp source is ignited, the heat also aids in the faster evaporation of the mercury and reduces the run-up time to a full light or steady state operation of the fluorescent lamp source 112. The sensor member 170 monitors the temperature of the compact fluorescent lamp source in the cathode region, and necessarily near the mercury reservoir. Once the light output of the compact fluorescent lamp source 112 reaches a predetermined value, an overall energy saving is improved by switching off power to the incandescent lamp source 140.

Figure 3:
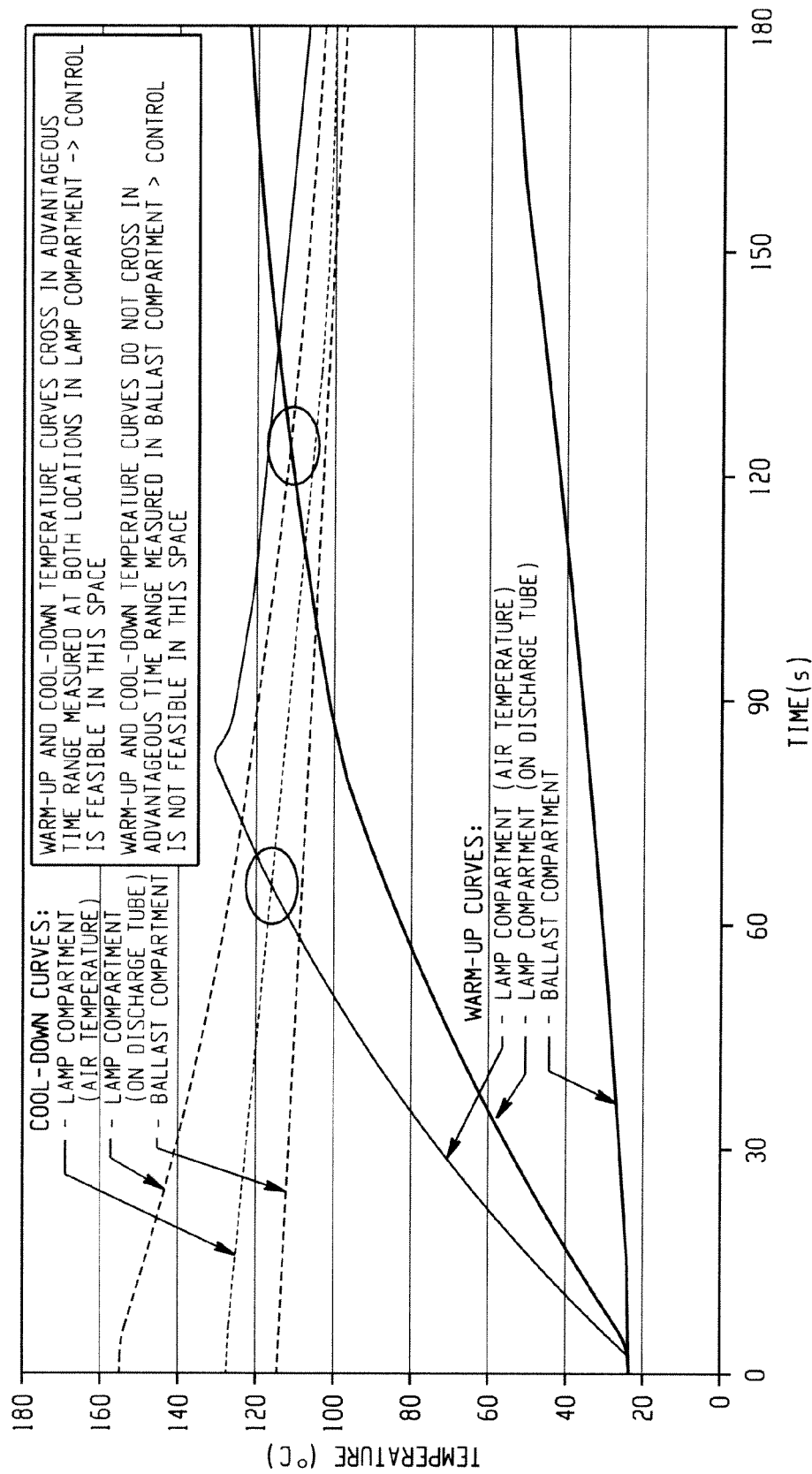
FIG. 3 is a graphical representation of warm-up and cool-down curves associated with the lamp assembly of the present disclosure.

The time to full light operation depends on how fast the glass discharge body reaches an optimal temperature where enough mercury can evaporate to the discharge vessel. This optimal temperature is closely associated with the wall temperature of the discharge tube, i.e., closely adjacent one of the cathodes. When the discharge vessel is cold due to the lamp being switched off for a long time, the instant light or incandescent light source 140 is needed to provide a certain percentage of the lumen value for the lamp assembly. As is known, the incandescent lamp source reaches its lumen value and a steady state condition immediately. On the other hand, if the lamp had been recently switched off and the discharge vessel is still at or close to the predetermined value as detected by the sensor member 170, there may be no need to use the instant light source 140 in order for the lumen value of the steady state condition of the compact fluorescent lamp 112 to be reached. Stated another way, the switch off time of the incandescent lamp source 140 depends on the temperature measured in the vicinity of the glass discharge wall close to the cathode. FIG. 3 illustrates these operative states of a cold discharge lamp as compared to the curve associated with a warm discharge lamp. These parameters are dependent on how long a time has passed since the compact fluorescent lamp source 112 had been active. For example, the switching occurs and power is terminated to the incandescent lamp source 140 once the compact fluorescent lamp source 112 reaches approximately 80% of its steady state condition.

Whereas a compact fluorescent lamp typically requires 0.5 to 1.5 seconds to preheat the electrodes before starting, and then requires an additional 20 to 120 seconds or more to reach the full light condition, the lamp assembly 100 of the present disclosure has an instant light feature of the incandescent lamp source 140 and a run-up time to full light of the compact fluorescent lamp source 112 close to 0 seconds. Energy savings is still achieved as a result of switching off the incandescent lamp source once the discharge tube adjacent the cathode has reached the predetermined value.

Both light sources are preferably located within the common outer bulb 160. This allows the arrangement to achieve the shortest warm-up period by reducing the loss of heat to the external environment. Moreover, location of the sensor member 170 more accurately reflects the operation of the compact fluorescent lamp and when to switch off power to the incandescent lamp source once the CFL has reached approximately 80% of its steady state condition.

The disclosure has been described with respect to preferred embodiments. Obviously, modifications and alterations may be contemplated by one skilled in the art, and the subject disclosure should not be limited to the particular examples described above but instead through the following claims.

What is claimed is:

1. A lamp assembly comprising:
   a lamp base having a compartment;
   a fluorescent lamp source mounted to the lamp base;
   an incandescent lamp source mounted to the lamp base and disposed adjacent to the fluorescent lamp;
   an envelope forming a cavity around at least the fluorescent and incandescent lamp sources;
   a power control module received in the lamp base compartment and operatively connected to the fluorescent and incandescent lamp sources;
   a thermal sensor member disposed in the envelope at a location separated from the lamp base compartment by a shield and adjacent a cathode of the fluorescent lamp source, and operatively communicating with the power control module for monitoring a temperature of the fluorescent lamp at the cathode whereby the power control module determines whether to terminate power supplied to the incandescent lamp source; and
   the shield extending between the thermal sensor and at least a portion of the lamp base compartment containing the power control module.

2. The lamp assembly of claim 1 wherein the thermal sensor is located adjacent a discharge tube wall of the fluorescent lamp source.

3. The lamp assembly of claim 1 wherein the power control module terminates power to the incandescent lamp source once the fluorescent lamp source has reached approximately 80% of its steady state operation.

4. The lamp assembly of claim 1 wherein the incandescent lamp source is disposed adjacent a mercury reservoir in the fluorescent lamp source.

5. The lamp assembly of claim 1 wherein the lamp base includes a threaded region for associated receipt in an associated threaded lamp socket.

6. The lamp assembly of claim 1 wherein the envelope also encloses at least a portion of the lamp base.

7. The lamp assembly of claim 1 wherein the shield extends between the power control module and the fluorescent lamp source.

8. The lamp assembly of claim 7 wherein the shield extends between the power control module and the incandescent lamp source.

9. The lamp assembly of claim 1 wherein the shield is void of air circulation slots and openings therethrough to serve a thermal barrier.

10. A lamp assembly for providing instant light and reducing run-up time comprising:
    a lamp base having an inner compartment;
    a fluorescent lamp source including an elongated discharge chamber extending between first and second cathodes, the fluorescent lamp source mounted to the lamp base and extending therefrom;
    an incandescent lamp source, mounted to the lamp base, including a filament and being disposed adjacent to the fluorescent lamp;
    a bulb forming a cavity around at least the fluorescent and incandescent lamp sources;
    a shield extending between the power control module in the lamp base compartment and the fluorescent and incandescent lamps in the envelope cavity;
    a thermal sensor member disposed in the envelope cavity adjacent a cathode of the fluorescent lamp source and separated from the lamp base compartment by the shield; and
    a power control module received in the lamp base compartment and operatively connected to the fluorescent and incandescent lamp sources, and the power control module, the power control module for monitoring a temperature of the fluorescent lamp source at the cathode and switching off the incandescent lamp in response to a measured temperature in the envelope cavity.

11. The lamp assembly of claim 10 wherein the incandescent lamp source includes an envelope surrounding the filament.

12. The lamp assembly of claim 10 wherein the fluorescent lamp source is a compact fluorescent lamp source that includes a tubular portion that encloses an interior volume, and the incandescent lamp source is received in the interior volume.

13. The lamp assembly of claim 12 wherein the compact fluorescent lamp is a spiral lamp with first and second legs extending from the lamp base, and the thermal sensor is located adjacent one of the legs.

14. The lamp assembly of claim 13 wherein the lamp assembly has a central axis and a longitudinal axis of the compact fluorescent lamp source is substantially aligned with the central axis.

15. The lamp assembly of claim 14 wherein a longitudinal axis of the incandescent lamp source is substantially aligned with the central axis.

16. The lamp assembly of claim 10 wherein the lamp base includes a plastic housing portion received in a base region of the bulb, the plastic housing portion includes a ballast for controlling operation of the fluorescent lamp source.

17. The lamp assembly of claim 10 wherein the incandescent lamp source is a tungsten halogen lamp.

18. A method of assembling a lamp comprising: providing a lamp base; mounting a fluorescent lamp source to the lamp base; positioning an incandescent lamp source adjacent the fluorescent lamp source; enclosing at least the fluorescent lamp source and the incandescent lamp source in a bulb; connecting the fluorescent lamp source and the incandescent lamp source to a power control module for selectively terminating power to the incandescent lamp source in response to the sensor detecting a predetermined temperature of the fluorescent lamp source; and locating a barrier wall between (i) a thermal sensor and (ii) the power control module, and the thermal sensor dispose adjacent a cathode of the fluorescent lamp source to monitor a temperature in the bulb.

19. The method of claim 18 further comprising allowing legs of the lamp sources to extend through the barrier wall for connection with the power control module.

20. The lamp assembly of claim 18 wherein the incandescent lamp source is a tungsten halogen lamp.

\* \* \* \* \*